(12) United States Patent
Rayev

(10) Patent No.: US 11,663,164 B2
(45) Date of Patent: May 30, 2023

(54) PERFORMING FILE-BASED TIME SERIES MANAGEMENT

(71) Applicant: EMC IP Holding Company LLC, Hopkinton, MA (US)

(72) Inventor: Alexander Rayev, Hopedale, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 279 days.

(21) Appl. No.: 17/141,535

(22) Filed: Jan. 5, 2021

(65) Prior Publication Data

US 2022/0215000 A1 Jul. 7, 2022

(51) Int. Cl.
*G06F 16/00* (2019.01)
*G06F 16/17* (2019.01)
*G06F 9/451* (2018.01)
*G06F 16/14* (2019.01)
*G06F 16/11* (2019.01)
*G06F 16/21* (2019.01)

(52) U.S. Cl.
CPC .......... *G06F 16/1734* (2019.01); *G06F 9/451* (2018.02); *G06F 16/116* (2019.01); *G06F 16/156* (2019.01); *G06F 16/217* (2019.01)

(58) Field of Classification Search
CPC ..................................................... G06F 16/217
See application file for complete search history.

(56) References Cited

U.S. PATENT DOCUMENTS

| | | | |
|---|---|---|---|
| 10,762,513 B2 | 9/2020 | Southall et al. | |
| 10,860,405 B1 | 12/2020 | Zonneveld et al. | |
| 11,151,014 B2 | 10/2021 | Gaber et al. | |
| 2017/0063897 A1* | 3/2017 | Muddu | ............... G06F 3/04842 |
| 2022/0019509 A1 | 1/2022 | Iyer et al. | |

* cited by examiner

*Primary Examiner* — Ajith Jacob
(74) *Attorney, Agent, or Firm* — BainwoodHuang

(57) ABSTRACT

A technique performs file-based time series management. The technique involves initiating a recordation operation that records a source-provided time series in rows of a row-formatted file. The technique further involves, after the recordation operation is initiated, encountering a conversion event. The technique further involves, in response to encountering the conversion event, performing a conversion operation that converts the source-provided time series recorded in the rows of the row-formatted file into a file-provided time series and saving the file-provided time series in columns of a column-formatted file.

20 Claims, 7 Drawing Sheets

PERFORMING FILE-BASED TIME SERIES MANAGEMENT

BACKGROUND

A conventional data storage system performance graphing tool displays data storage system performance to a human administrator. Accordingly, the human administrator may be able to identify certain performance patterns and trends, and adjust the operation of the data storage system to improve future performance.

During operation, the data storage system performance graphing tool receives a stream of timestamped performance inputs and stores each timestamped performance input in a separate file. The human administrator may then use a browser to read and view the timestamped performance inputs from the separate files.

SUMMARY

Unfortunately, there are deficiencies with the above-described conventional data storage system performance graphing tool which receives a stream of timestamped performance inputs and stores each timestamped performance input in a separate file. Along these lines, such a conventional architecture may work well if periodicity for the timestamped performance input is infrequent (e.g., a new timestamped performance input every minute, every 30 seconds, or even every 20 seconds). However, the above-described conventional data storage system performance graphing tool will encounter difficulties if the periodicity is more frequent such as every 5 seconds or every second. For example, such higher periodicity causes the number of files to become excessively high.

In contrast to the above-identified conventional data storage system performance graphing tool which receives a stream of timestamped performance inputs and stores each timestamped performance input in a separate file, improved techniques are directed to performing file-based time series management using both a row-formatted file and a column-formatted file. In particular, a raw time series is recorded in rows of the row-formatted file. A conversion operation is then performed that converts the raw time series from the row-formatted file into a processed time series which is saved in columns of the column-formatted file. Such use of the row-formatted file enables fast storage of the raw time series. Additionally, such use of the column-formatted file enables fast retrieval of the processed time series for display and/or analysis purposes, as well as minimal consumption of storage space. Accordingly, such techniques are particularly well suited for certain applications that record samples of a time series relatively frequently (e.g., every 5 seconds or less) over a relatively long period of time (e.g., over a 48 hour period), and then graphically render the time series such as a performance analysis tool for data storage equipment.

It should be understood that, in accordance with certain embodiments, the improved techniques do not merely collect data, process the data, and store the data. Rather, such techniques provide improvements to the technology.

For example, such techniques provide advantages over a simple row oriented database approach in which multiple timestamped performance inputs are entered into a database. Along these lines, suppose that one were to simply make a new entry containing certain timestamped data storage performance input into such a database every five seconds over a 48 hour period. Unfortunately, it is estimated that the size of the database would be excessive (e.g., greater than 8 GBs). Moreover, the database may suffer from data retrieval lags due to the overhead of row based memory allocations. Existing column oriented databases will not be performing under available system resources, and will not satisfy the required new entry simplicity and speed in particular.

Additionally, such techniques provide advantages over a simple row-formatted file approach in which multiple timestamped performance inputs are written into a row-formatted file such as a comma-separated values (CSV) file. Along these lines, suppose that one were to simply write a new row containing certain timestamped data storage performance input into a CSV file every five seconds over a 48 hour period. Unfortunately, it is estimated that the size of the CSV file would still be excessive (e.g., greater than 4.5 GBs). Moreover, the task of reading the timestamped performance inputs from the rows of the CSV file and then rendering on the timestamped performance inputs graphically via a browser is sub-optimal.

Furthermore, such techniques provide advantages over a simple column-based file approach in which multiple timestamped performance inputs are written into a column-formatted file such as a parquet file. Along these lines, suppose that one were to write a new entry containing certain timestamped data storage performance input into a parquet file every five seconds over a 48 hour period. Unfortunately, it is difficult or even impractical to write a new entry of timestamped data storage performance input into a column-formatted file without costly file close and re-open operations. Most column formatted files do not even support the simple feature of appending a new entry.

In accordance with certain techniques, initially recording a raw time series into a row-formatted file enables fast storage of the raw time series. Additionally, subsequent conversion of the raw time series into a processed time series and saving the processed time series into a column-formatted file enables fast retrieval of the processed time series as well as minimal consumption of storage space. Such techniques are thus advantageous and/or optimized for certain operations over the above-described simpler approaches thus improving the technology.

One embodiment is directed to a method of performing file-based time series management. The method includes initiating a recordation operation that records a source-provided time series in rows of a row-formatted file. The method further includes, after the recordation operation is initiated, encountering a conversion event. The method further includes, in response to encountering the conversion event, performing a conversion operation that converts the source-provided time series recorded in the rows of the row-formatted file into a file-provided time series and saving the file-provided time series in columns of a column-formatted file.

Another embodiment is directed to data storage equipment which includes memory and control circuitry coupled to the memory. The memory stores instructions which, when carried out by the control circuitry, cause the control circuitry to perform a method of:

(A) initiating a recordation operation that records a source-provided time series in rows of a row-formatted file, (B) after the recordation operation is initiated, encountering a conversion event, and (C) in response to encountering the conversion event, performing a conversion operation that converts the source-provided time series recorded in the rows of the row-formatted file into a file-provided time series and saving the file-provided time series in columns of a column-formatted file.

Yet another embodiment is directed to a computer program product having a non-transitory computer readable medium which stores a set of instructions to perform file-based time series management. The set of instructions, when carried out by computerized circuitry, causes the computerized circuitry to perform a method of:

(A) initiating a recordation operation that records a source-provided time series in rows of a row-formatted file;

(B) after the recordation operation is initiated, encountering a conversion event; and (C) in response to encountering the conversion event, performing a conversion operation that converts the source-provided time series recorded in the rows of the row-formatted file into a file-provided time series and saving the file-provided time series in columns of a column-formatted file.

In some embodiments, the method further includes, after the file-provided time series is saved in the columns of the column-formatted file, reading the file-provided time series from the columns of the column-formatted file. The method further includes rendering at least a portion of the file-provided time series on a display to a user.

In some embodiments, the source-provided time series and the file-provided time series contain data storage array performance metrics measured during a time period. Additionally, rendering includes presenting a graphical user interface (GUI) to the user. The GUI graphically displays at least some of the data storage array performance metrics measured during the time period to the user.

In some embodiments, initiating the recordation operation includes periodically recording a new central processing unit (CPU) measurement from a data storage array in a separate row of the row-formatted file. The rows of the row-formatted file are ordered based on time.

In some embodiments, initiating the recordation operation includes periodically recording a new input/output (I/O) measurement from a data storage array in a separate row of the row-formatted file. The rows of the row-formatted file are ordered based on time.

In some embodiments, initiating the recordation operation includes periodically recording a new latency measurement from a data storage array in a separate row of the row-formatted file. The rows of the row-formatted file are ordered based on time.

In some embodiments, initiating the recordation operation further includes, prior to recording the source-provided time series in the rows of the row-formatted file, starting a conversion event timer. Additionally, encountering the conversion event includes detecting, as the conversion event, expiration of the conversion event timer.

In some embodiments, encountering the conversion event includes detecting, as the conversion event, that a number of rows in the row-formatted file has reached a predefined threshold number.

In some embodiments, encountering the conversion event includes detecting, as the conversion event, that the source-provided time series covers a predefined amount of time.

In some embodiments, performing the conversion operation includes reading rows of data storage performance metrics from the row-formatted file and writing the data storage performance metrics in the columns of the column-formatted file.

In some embodiments, the row-formatted file is a delimiter-separated values file. Examples include a CSV file, a tab-separated values (TSV) file, a standard text file, and the like.

In some embodiments, the column-formatted file is a flat columnar storage format file. Examples include an optimized row columnar (ORC) file, a Record Columnar File (RCFile), a parquet file, and the like.

In some arrangements, the method further includes, in response to encountering the conversion event, initiating another recordation operation that records another source-provided time series in rows of another row-formatted file.

In some arrangements, the source-provided time series contains data storage array performance metrics measured during a first time period. Additionally, the other source-provided time series contains data storage array performance metrics measured during a second time period after the first time period. Also, the method further includes rendering at least a portion of the other source-provided time series on the display to the user.

In some arrangements, the method further includes rendering at least a portion of another file-provided time series on the display to the user. The other file-provided time series is rendered from another column-formatted file that saves the other file-provided time series in columns of the other column-formatted file.

It should be understood that, in the cloud context, at least some electronic circuitry (e.g., hosts, backup sites, etc.) is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, componentry, computer program products, and so on. Some embodiments are directed to various methods, electronic components and circuitry which are involved in performing file-based time series management.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to performing file-based time series management using both a row-formatted file and a column-formatted file. Along these lines, a raw time series is recorded in rows of the row-formatted file. A conversion operation is then performed that converts the raw time series from the row-formatted file into a processed time series which is saved in columns of the column-formatted file. Such use of the row-formatted file enables fast storage of the raw time series. Additionally, such use of the column-formatted file enables fast retrieval of the processed time series as well as minimal consumption of storage space. Accordingly, such techniques are particularly well suited for certain applications that record samples of a time series relatively frequently (e.g., every 5 seconds or less) over a relatively long period of time (e.g., over a 48 hour period), and then graphically display the time series such as a performance analysis tool for data storage equipment.

Figure 1:
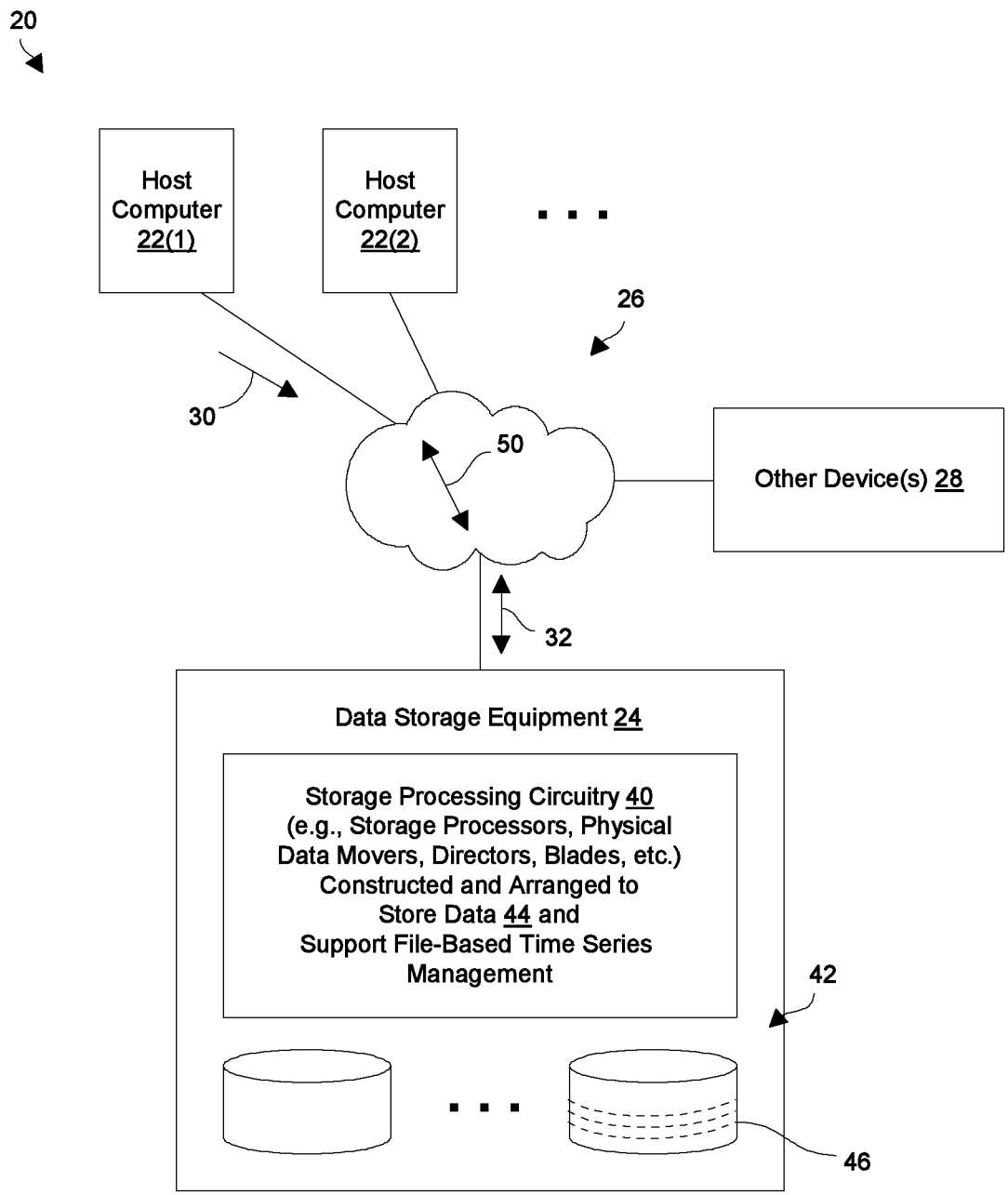
FIG. 1 is a block diagram of a data storage environment which performs file-based time series management in accordance with certain embodiments.

FIG. 1 shows a data storage environment 20 which performs file-based time series management in accordance with certain embodiments. The data storage environment 20 includes host computers 22(1), 22(2), . . . (collectively, host computers 22), data storage equipment 24, a communications medium 26, and perhaps other devices 28.

Each host computer 22 is constructed and arranged to perform useful work. For example, one or more of the host computers 22 may operate as a file server, a web server, an email server, an enterprise server, a database server, a transaction server, combinations thereof, etc. which provides host input/output (I/O) requests 30 to the data storage equipment 24. In this context, the host computers 22 may provide a variety of different I/O requests 30 (e.g., block and/or file based write commands, block and/or file based read commands, combinations thereof, etc.) that direct the data storage equipment 24 to store host data 32 within and retrieve host data 32 from storage (e.g., primary storage or main memory, secondary storage or non-volatile memory, tiered storage, combinations thereof, etc.).

The data storage equipment 24 includes storage processing circuitry 40 and storage devices 42. The storage processing circuitry 40 is constructed and arranged to respond to the host I/O requests 30 from the host computers 22 by writing data 44 into the storage devices 42 and reading the data 44 from the storage devices 42. The storage processing circuitry 40 may include one or more storage processors or engines, data movers, director boards, blades, I/O modules, storage device controllers, switches, other hardware, combinations thereof, and so on. Furthermore, in accordance with certain embodiments, at least some of the storage devices 42 provide disk slices 46 that are used in a mapped-RAID architecture.

When processing the host I/O requests 30, the storage processing circuitry 40 is capable of providing data storage performance metrics which describe various operating aspects such as (CPU) utilization measurements, I/O metrics (e.g., I/O's per second or TOPS), latency metrics, storage space capacity, and so on. Additionally, the storage processing circuitry 40 may provide a variety of specialized data storage services and features such as caching, storage tiering, deduplication, compression, encryption, mirroring and/or other RAID protection, snapshotting, backup/archival services, replication to other data storage equipment, and so on.

It should be understood that the data 44 may include the host data 32 from the host computers 22. The data 44 may include other data as well such as data created from user-level applications running on the data storage equipment 24, data generated from processing the host data 32 locally on the data storage equipment 24, snapshots of the host data 32, and so on. The data 44 may further include other types of data such as parity, mapping data, block and/or file system metadata, deduplication data, compression data, versioning data, data to support recovery, configuration data, and other types of metadata, combinations thereof, and so on, which is managed and maintained by the data storage equipment 24.

The communications medium 26 is constructed and arranged to connect the various components of the data storage environment 20 together to enable these components to exchange electronic signals 50 (e.g., see the double arrow 50). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, cellular communications, WAN-based communications, distributed infrastructure communications, other topologies, combinations thereof, etc.

The other devices 28 represent other possible componentry of the data storage environment 20. Along these lines, the other devices 28 may include management tools to remotely monitor and/or control operation of the data storage equipment 24. Additionally, the other devices 28 may include remote data storage equipment that provides user data 44 to and/or receives user data 44 from the data storage equipment 24 (e.g., replication arrays, backup and/or archiving equipment, service processors and/or management devices, etc.).

During operation, the storage processing circuitry 40 of the data storage equipment 24 performs data storage operations to richly and robustly store the data 44 within the storage devices 42. Additionally, for performance rendering and/or analysis, the storage processing circuitry 40 is capable of supporting file-based time series management which uses both a row-formatted file and a column-formatted file. That is, the data storage equipment 24 runs a set of performance tools 48 that samples the performance metrics periodically, and saves this information as a time series for access by a user. Examples of such performance metrics include central processing unit (CPU) utilization measurements, I/O metrics (e.g., I/O's per second or TOPS), latency metrics, storage space capacity, and so on.

In accordance with certain embodiments, the set of performance tools 48 completely resides locally on the data storage equipment 24. In accordance with other embodiments, the set of performance tools 48 is distributed within the data storage environment (e.g., collectors running on the data storage equipment 24, back-end rendering running on one or more of the other devices 28 and/or one or more host computers 22, etc.). Further details will now be provided with reference to FIG. 2.

Figure 2:
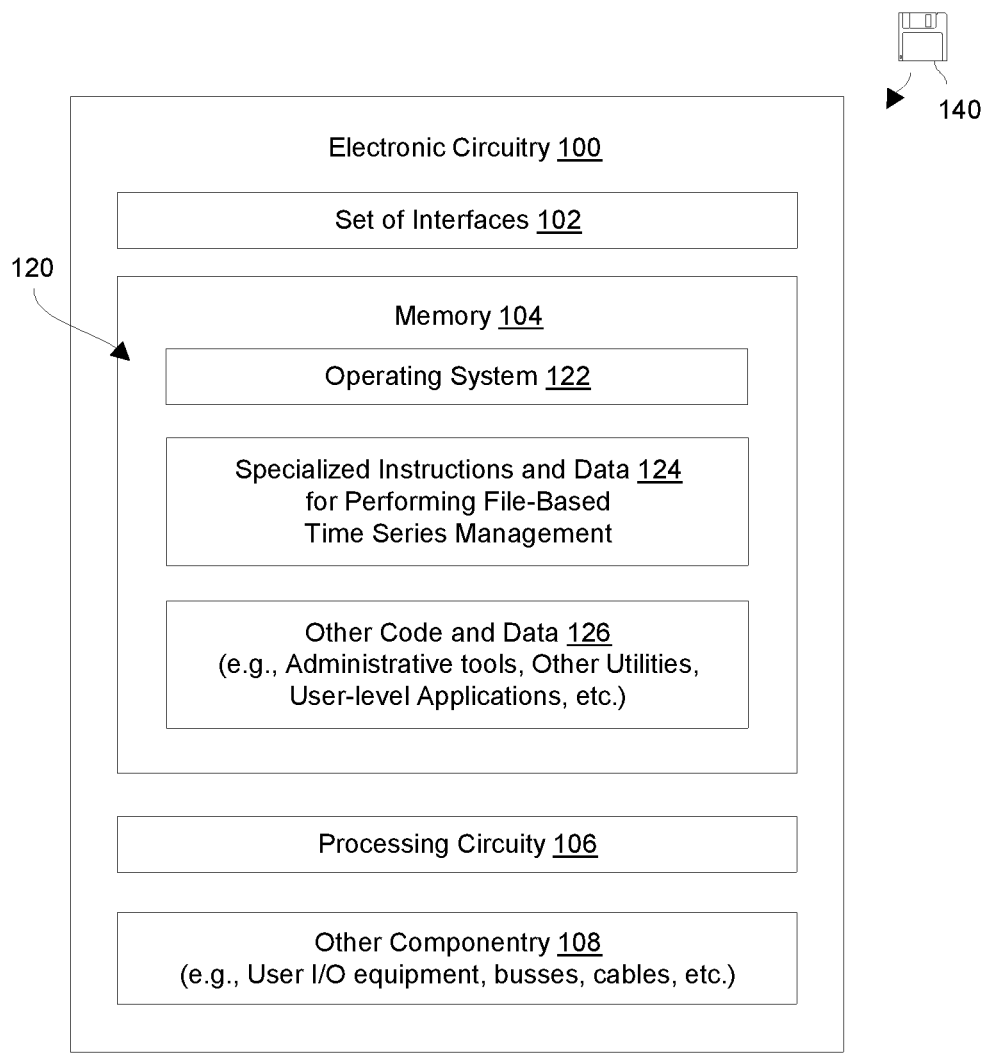
FIG. 2 is a block diagram of electronic circuitry of the data storage environment in accordance with certain embodiments.

FIG. 2 shows electronic circuitry 100 which is suitable for the storage processing circuitry 40 of the data storage equipment 24 and for performing file-based time series management for performance analysis purposes (also see FIG. 1). The electronic circuitry 100 includes a set of interfaces 102, memory 104, and processing circuitry 106, and other circuitry 108.

The set of interfaces 102 is constructed and arranged to connect the electronic circuitry 100 to the communications medium 26 (also see FIG. 1) to enable communications with other devices of the data storage environment 20 (e.g., the host computers 22). Such communications may be IP-based, SAN-based, cellular-based, cable-based, fiber-optic based, wireless, cloud-based, combinations thereof, and so on. Accordingly, the set of interfaces 102 may include one or more host interfaces (e.g., a computer network interface, a fibre-channel interface, etc.), one or more storage device interfaces (e.g., a host adapter or HBA, etc.), and other interfaces. As a result, the set of interfaces 102 enables the electronic circuitry 100 to robustly and reliably communicate with other external apparatus.

The memory 104 is intended to represent both volatile storage (e.g., DRAM, SRAM, etc.) and non-volatile storage (e.g., flash memory, magnetic memory, etc.). The memory 104 stores a variety of software constructs 120 including an operating system 122, specialized instructions and data 124, and other code and data 126. The operating system 122 refers to particular control code such as a kernel to manage computerized resources (e.g., processor cycles, memory space, etc.), drivers (e.g., an I/O stack), and so on. The specialized instructions and data 124 refers to particular instructions for performing file-based time series management which uses both a row-formatted file and a column-formatted file. In some arrangements, the specialized instructions and data 124 is tightly integrated with or part of the operating system 122 itself. The other code and data 126 refers to applications and routines to provide additional operations and services such as user-level applications, administrative tools, utilities, and so on.

The processing circuitry 106 is constructed and arranged to operate in accordance with the various software constructs 120 stored in the memory 104. As will be explained in further detail shortly, the processing circuitry 106 executes the operating system 122 and the specialized code 124 to form specialized circuitry that robustly and reliably manages host data on behalf of a set of hosts and enables file-based time series management. Such processing circuitry 106 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 140 is capable of delivering all or portions of the software constructs 120 to the storage processing circuitry 106. In particular, the computer program product 140 has a non-transitory (or non-volatile) computer readable medium which stores a set of instructions that controls one or more operations of the electronic circuitry 100. Examples of suitable computer readable storage media include tangible articles of manufacture and apparatus which store instructions in a non-volatile manner such as DVD, CD-ROM, flash memory, disk memory, tape memory, and the like.

The other componentry 108 refers to other hardware of the electronic circuitry 100. Along these lines, the electronic circuitry 100 may include special user I/O equipment (e.g., a service processor), busses, cabling, adaptors, auxiliary apparatuses, other specialized data storage componentry, etc.

It should be understood that the processing circuitry 106 operating in accordance with the software constructs 120 enables time series management that uses both a row-formatted file and a column-formatted file. Such use of a row-formatted file enables fast recording of one or more performance metrics at relatively short intervals (e.g., every five seconds, every second, etc.). Such use of a column-formatted file enables fast retrieval and efficient storage of such performance metrics.

It should be further understood that, in a distributed or client/server configuration in which performance measurements are made within the data storage equipment 24 but some or all of the file-based time series management is performed remotely, some or all of the specialized instructions and data 124 may still reside locally within the data storage equipment 24. Alternatively, some or all of the specialized instructions and data 124 may reside remotely where file-based time series management is performed (e.g., within a remote service processor, within a host, etc.). Further details will now be provided with reference to FIG. 3.

Figure 3:
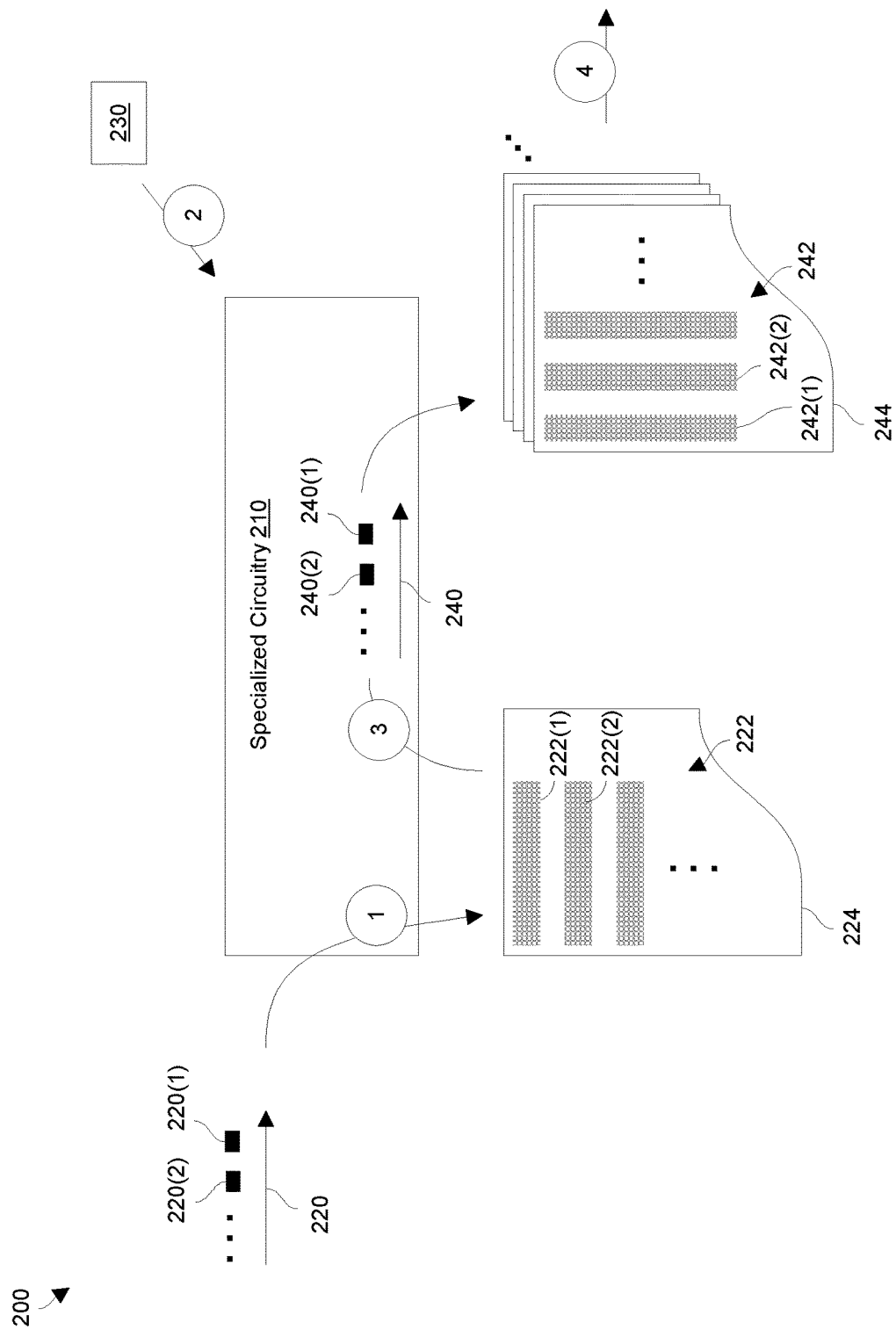
FIG. 3 is a block diagram illustrating particular details of a file-based time series management process in accordance with certain embodiments.

FIG. 3 shows particular details of a file-based time series management process 200 in accordance with certain embodiments. Such details will be described in the context of a tool for a data storage array (e.g., see FIG. 1). However, it should be understood that such a file-based time series management process 200 may be used in applications other than those for a data storage array.

Initially, specialized circuitry 210 receives a raw time series 220. In accordance with certain embodiments, the source of the raw time series 220 is data storage circuitry that performs data storage operations on behalf of a set of hosts (also see FIG. 1). The specialized circuitry 210 and the data storage circuitry that performs data storage operations may be formed by the same processing circuitry running different code (e.g., see FIG. 2) or by separate circuitry.

The specialized circuitry 210 stores the raw time series 220 in rows 222 of a row-formatted file 224 as illustrated by the arrow (1). The raw time series 220 includes sets of new data points 220(1), 220(2), . . . provided by the data storage circuitry at different sampling times. In some arrangements, the data storage circuitry provides each set of new data points 220 in response to periodic query. In other arrangements, the data storage circuitry is configured to provide each set of new data points 220 automatically (e.g., via a scheduler) after receiving an initial command.

For example, at a first time T(1), the data storage circuitry provides a first set of new data points 220(1). In response, the specialized circuitry 210 stores a first row 222(1) of information containing the first set of new data points 220(1) in the row-formatted file 224.

Next, at a second time T(2), the data storage circuitry provides a second set of new data points 220(2). In response, the specialized circuitry 210 stores a second row 222(2) of information containing the second set of new data points 220(2) in the row-formatted file 224, and so on.

It should be understood that the time interval in which the specialized circuitry 210 receives a set of new data points 220 may be constant. Along these lines, the interval between sampling times may be N seconds where N is a number such as five (e.g., sampling every five seconds). However, N may be a different number such as one, two, three, four, 10, 15, 20, etc.

In accordance with certain embodiments, the specialized circuitry 210 may add information to the row-formatted file 224. For example, if each set of new data points 220 does not include a timestamp, the specialized circuitry 210 may add a respective timestamp as a data item in each row 222, or add an initial timestamp as a header to the row-formatted file 224 and row numbers (or indexes) in each row 222. The specialized circuitry 220 may similarly add other information as well such as equipment identification, array configuration information, tool identification, version numbers, and so on.

After a period of time, the specialized circuitry 210 encounters a conversion event 230 as illustrated by the arrow (2) (e.g., from a counter, from a timer, from a scheduler, etc). This conversion event 230 signals the specialized circuitry 210 to perform a conversion operation as illustrated by the arrow (3). When performing the conversion operation, the specialized circuitry 210 converts the raw time series 220 from the row-formatted file 224 into a processed time series 240 and stores the processed time series 240 in columns 242 of a column-formatted file 244.

In particular, the specialized circuitry 210 reads the rows 222 of information from the row-formatted file 224 and writes columns 242 in the column-formatted file 244. Such reading and/or writing may be performed in relatively large sections (e.g., reading multiple rows 222 at a time, writing multiple columns 242 at a time, etc.) or individually (e.g., reading a row 222 and writing a column 242, and then the next, etc.). Furthermore, in a manner similar to that for the row-formatted file 224, the specialized circuitry 210 may add information to the column-formatted file 244. Upon completion of the conversion operation (e.g., after the specialized circuitry 210 reads all the rows 222 and writes all the columns 242), the specialized circuitry 210 may delete the row-formatted file 224 to reclaim storage space.

It should be understood that encountering the conversion event 230 serves as a trigger for the specialized circuitry 210 to begin the conversion operation. There are variety of suitable ways for the specialized circuitry 210 to encounter the conversion event 230.

In some arrangements, when the specialized circuitry 210 begins recording the raw time series 220 in the row-formatted file 224, the specialized circuitry 210 starts a timer that expires after a predetermined amount of time elapses (e.g., after 30 minutes, after one hour, etc.). When the timer expires, the specialized circuitry performs the conversion operation (arrow (3)).

In other arrangements, the specialized circuitry 210 maintains a count (or tally) of the number of rows in the row-formatted file 224. When the number of rows 222 in the row-formatted file 224 reaches a certain predefined value (i.e., the conversion event 230), the specialized circuitry 210 starts the conversion operation. For example, for the raw time series 220 to cover one hour, there would be 720 rows 222 in the row-formatted file 224 if a row 222 containing a set of new data new data points 220 is written to the row-formatted file 224 every five seconds (i.e., if the row-formatted file 224 is written 12 times every minute for an entire hour). Similarly, to cover one hour, there would be 3600 rows 222 in the row-formatted file 224 if a row 222 containing a set of new data new data points 220 is written to the row-formatted file 224 every second (i.e., if the row-formatted file 224 is written 60 times every minute for an entire hour), and so on. Other counting approaches are suitable for use as well.

To avoid interference, the specialized circuitry 210 may continue to receive sets of new data points 220 but now stores the sets of new data points 220 in a new row-formatted file 224. Accordingly, recordation of the raw time series in a new row-formatted file 224 (arrow (1)) and the conversion operation (arrow (3)) may be performed in parallel. As each new row-formatted file 224 fills to a certain level, a new conversion event 230 triggers the specialized circuitry 210 to perform a conversion operation (arrow (3)) on that row-formatted file 224 to provide a new column-formatted file 244 containing a process time series 240.

When writing information to each column-formatted file 244, the specialized circuitry 210 may preserve any information that was added to the row-formatted file 224 such as timestamps, identification information, version data, and so on. Moreover, the specialized circuitry 210 may add information to the column-formatted file 244 (e.g., a timestamp for the conversion operation, etc.).

It should be further understood that the specialized circuitry 210 may continue to perform the file-based time series management process 200 indefinitely or for an extended period of time. Each time the specialized circuitry 210 performs the conversion operation, the specialized circuitry 210 may save the processed time series 240 (i.e., a portion of an overall processed time series) in a different column-formatted file 244 (e.g., see FIG. 3). Additionally, once the conversion operation is finished, the specialized circuitry 210 may delete the row-formatted file 224 that served as the source of the raw time series 220 to save storage space (e.g., while a new raw time series 220 is stored in a new row-formatted file 224).

In accordance with certain embodiments, if the conversion operation is performed every hour, each created column-formatted file 244 will hold one hour of a processed time series 240. Moreover, the information contained among the column-formatted files 244 and even contained within the row-formatted file 224 may be rendered together to provide an aggregated continuous time series.

For subsequent access purposes, such column-formatted files 244 may be differentiated base on filename, data within the respective column-formatted files 244, combinations thereof, and so on. In particular, in a subsequent operation illustrated as arrow (4), the information within the column-formatted files 244 may be processed for use by a user and/or equipment. Such processing may be performed by the specialized circuitry 210 and/or other circuitry. Along these lines, the information may be analyzed, tallied, evaluated, etc. and certain results, etc. may be rendered graphically to a user. Further details will now be provided with reference to FIG. 4.

Figure 4:
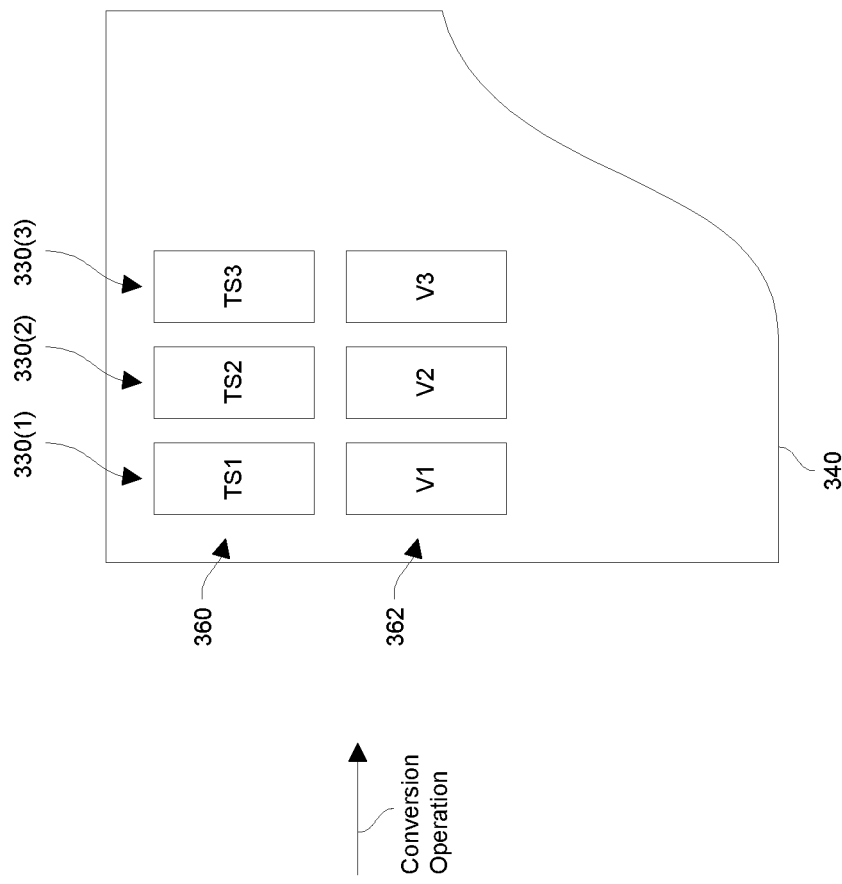
FIG. 4 is a block diagram illustrating a simple example in accordance with certain embodiments.
Figure 4:
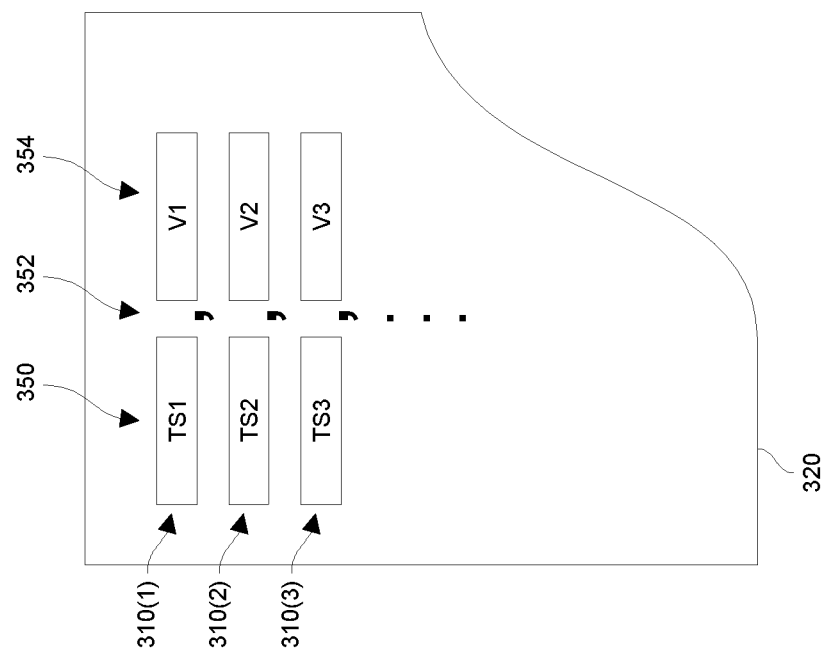

FIG. 4 shows a simple example 300 which is suitable for use in the conversion process 200 (FIG. 3). In particular, the simple example 300 involves processing rows 310 of information of a row-formatted file 320 into columns 330 of information of a column-formatted file 340.

The row-formatted file 320 includes rows 310(1), 310(2), 310(3), . . . containing a raw time series (also see FIG. 3). Example files for the row-formatted file 320 include CSV files, TSV files, a standard text file, and other delimiter-separated value files that are row-based. One should appreciate that the individual rows 310 may be quickly written to such a row-based file 320 (e.g., by simply appending a new row 310 at the end of the file) thus making the file 320 optimal for adding new data points of the raw time series in short intervals (once every five seconds, once a second, etc.). However, one should further appreciate that such row-based files may not be ideal for certain operations such as quickly reading the raw time series in order to graphically render the raw time series in an X-Y plot, where time increases along the X-axis, and the data points are plotted along the Y-axis.

As further shown in FIG. 4, the rows 310 include timestamps 350, delimiters 352, and data point values 354. In particular, the row 310(1) includes a timestamp TS1, a comma as the delimiter, and a data point value V1. Similarly, the row 310(2) includes a timestamp TS2, another comma as the delimiter, and a data point value V2. Furthermore, the row 310(3) includes a timestamp TS3, another comma as the delimiter, and a data point value V3, and so on.

As a result of the conversion operation, the column-formatted file 340 includes, as columns 330, columns 330(1), 330(2), 330(3), . . . which contain a processed time series derived from the raw time series (also see FIG. 3). Example files for the column-formatted file 340 include optimized row columnar (ORC) files, Record Columnar Files (RCFile's), parquet files, and other files that are column-based. It should be understood that such column-based files are well suited for certain operations such as quickly reading the processed time series in order to graphically render the processed time series in an X-Y plot, where time increases along the X-axis, and the data points are plotted along the Y-axis (i.e., each column 330 defines a particular data point on the X-Y plot).

Moreover, in accordance with certain embodiments, the column-formatted file 340 consumes less space than that of the row-formatted file 320. Accordingly, storage efficiency is improved by replacing the row-formatted file 320 with the column-formatted file 340.

As further shown in FIG. 4, the columns 330 include timestamps 360 and data point values 362. In particular, the column 330(1) includes the timestamp TS1 and the data point value V1 from the row-formatted file 320. Similarly, the column 330(2) includes the timestamp TS2 and the data point value V2, the column 330(3) includes the timestamp TS3 and the data point value V3, and so on.

The column-formatted file 340 may include the same information as that of the row-formatted file 320. Alternatively, the column-formatted file 420 may further include additional information, less information, and/or replace certain information from the row-formatted file 320.

Figure 5:
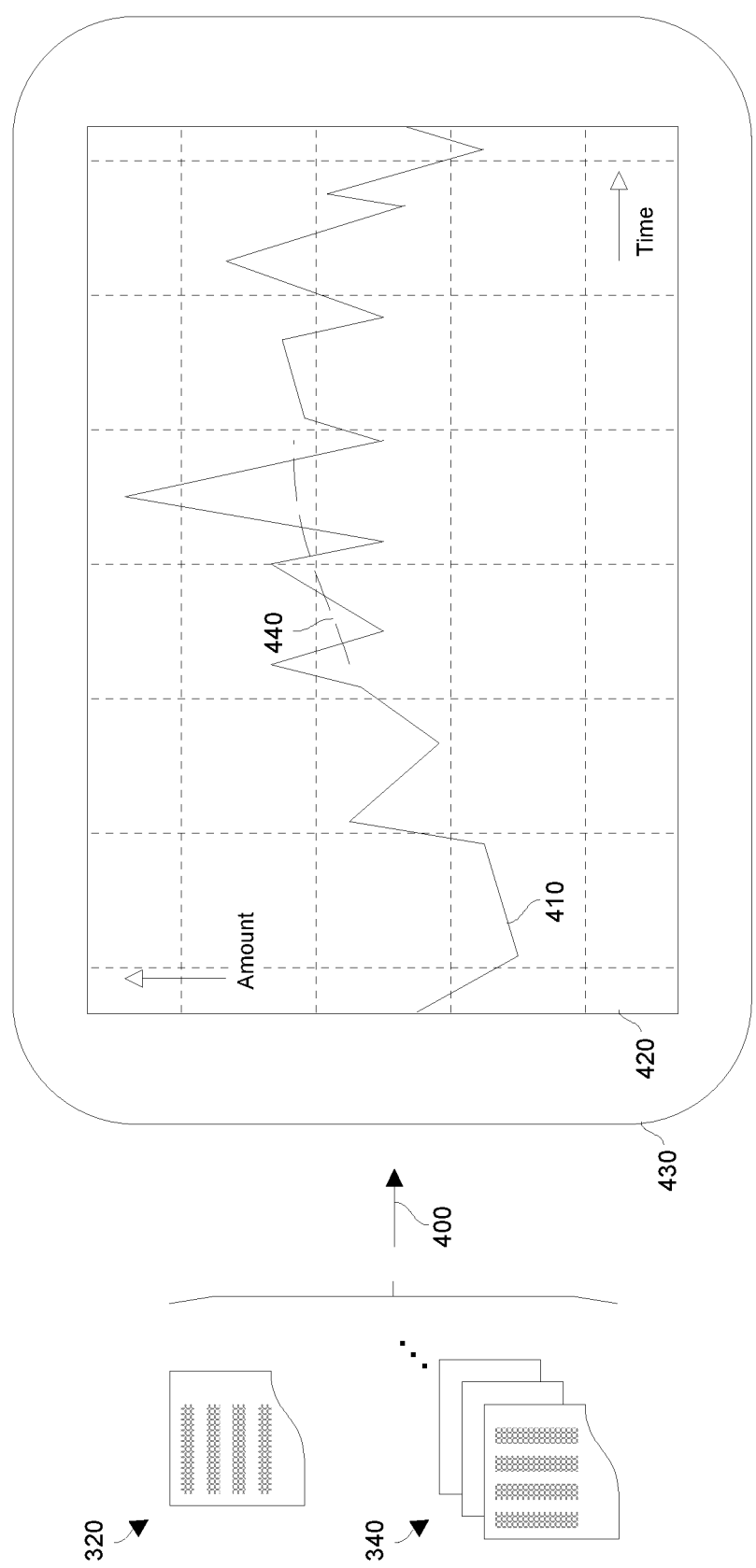
FIG. 5 is a block diagram illustrating certain rendering details in accordance with certain embodiments.

FIG. 5 shows, by way of example, a rendering operation 400 performed on information from multiple column-formatted files 244 and a row-formatted file 224 (also see arrow (4) in FIG. 3). The multiple column-formatted files 244 store time series data points that were captured previously in earlier row-formatted files 224 and then converted for storage with the column-formatted files 244. The row-formatted file 224 stores very recently captured time series data points before conversion is performed on the row-formatted file 224. The information that was shown in the simple example 300 of FIG. 4 is suitable for use as input for the rendering operation 400.

One should appreciate that the information from the various files 224, 244 may provide an aggregated continuous time series. For example, suppose that conversion is performed on a new row-formatted file 224 every hour. Then the current row-formatted file 224 contains less than an hour of the time series (i.e., data points received within the hour), and each column-formatted file 244 contains one previous hour of the time series.

As shown in FIG. 5, the information within the column-formatted files 244 and the row-formatted file 224 may be processed and rendered as a curve 410 on a graphical user interface (GUI) 420 displayed on an electronic monitor 430. In the example, timestamp information is used to identify displacement along the X-axis (i.e., time) and value information is used to identify displacement along the Y-axis (i.e., amount) (also see FIG. 4).

In some embodiments, the information from the files 320, 340 is not only displayed but also processed for use. For example, the value information may be averaged over a time period in order to plot, as another curve 440, a moving average a portion of which is illustrated in FIG. 5. Other processing operations are suitable as well such as summations, high and low identification, and so on.

Figure 6:
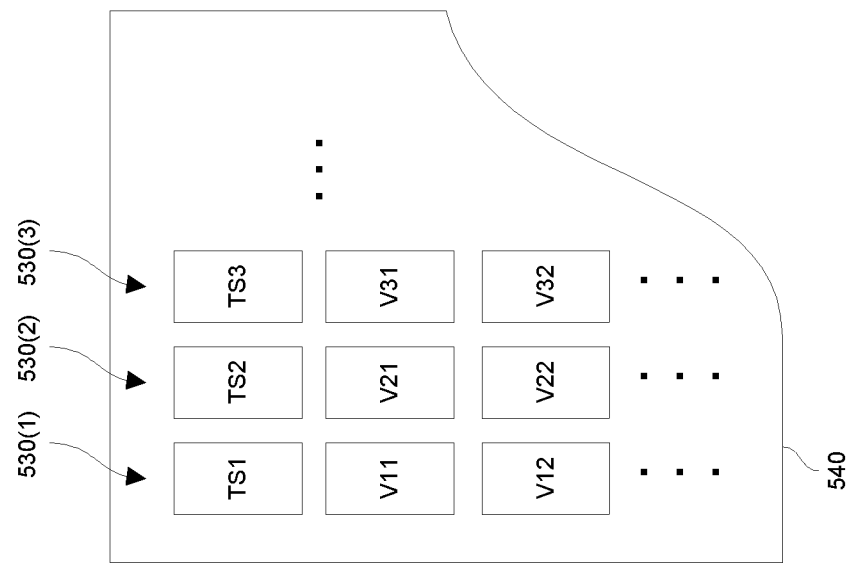
FIG. 6 is a block diagram illustrating another example in accordance with certain embodiments.
Figure 6:
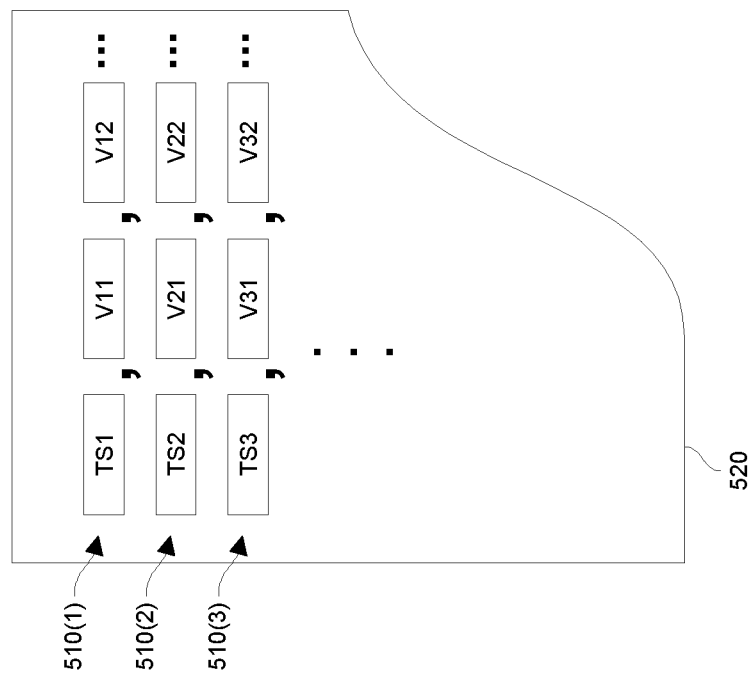

FIG. 6 shows another example 500 for processing rows 222 of information of a row-formatted file 224 into columns 242 of information of a column-formatted file 244 (also see FIG. 3). In the example 500, rows 510 of information of a row-formatted file 520 are processed into columns 530 of information of a column-formatted file 540.

The example 500 is similar to the example 300 (FIG. 4) except that each row 510 and each column 520 include more than two data items. Accordingly, certain details that apply to the example 300 may also apply to the example 500 and will not be discussed further.

The row-formatted file 520 includes rows 510(1), 510(2), 510(3), . . . containing a raw time series (also see FIG. 3). By way of example only, the rows 510 include timestamps, delimiters, and data point values. In particular, the row 510(1) includes a timestamp TS1, a comma as a delimiter, a data point value V11, another comma as another delimiter, a data point value V12, etc. Similarly, the row 510(2) includes a timestamp TS2, a comma as a delimiter, a data point value V21, another comma as another delimiter, a data point value V22, etc. Furthermore, the row 510(3) includes a timestamp TS3, a comma as a delimiter, a data point value V31, another comma as another delimiter, a data point value V32, and so on.

As a result of the conversion operation, the column-formatted file 540 includes, as columns 530, columns 530(1), 530(2), 530(3), . . . which contain a processed time series derived from the raw time series (also see FIG. 3). That is, the columns 530 include timestamps and data point values. In particular, the column 530(1) includes the timestamp TS1, the data point values V11, V12, V13, . . . from the row-formatted file 520. Similarly, the column 530(2) includes the timestamp TS2 and the data point values V21, V22, V23, . . . , the column 530(3) includes the timestamp TS3 and the data point value V31, V32, V33, . . . , and so on.

It should be understood that the example 500 enables multiple data items to be stored together in the same rows 510 of the row-formatted file 520 and in the same columns 530 of the column-formatted file 540. Such a feature supports handling certain metrics together such as CPU utilization, IOPS, and latency. Such a feature also support handling data for multi-dimensional spaces beyond 2-dimensions such as when a data point has several different characteristics or aspects that are measured.

However, it should be understood that nothing precludes equipment from running separate processes 200 to manage different time series. For example, one process 200 may manage a CPU utilization time series, another process 200 may manage an IOPS time series, and another process 200 may manage a latency time series, and so on. Such processes 200 may run in parallel and independently.

It should be further appreciated that the row-formatted file 520 is particularly well-suited for fast recording of new rows 510 (e.g., every five seconds). Additionally, the column-formatted file 540 is particularly well-suited for fast retrieval of information from columns 530 (e.g., for rendering, navigating, analyzing, etc. by a user). Moreover, the column-formatted file 540 consumes substantially less space than the row-formatted file 520. Further details will now be provided with reference to FIG. 7.

Figure 7:
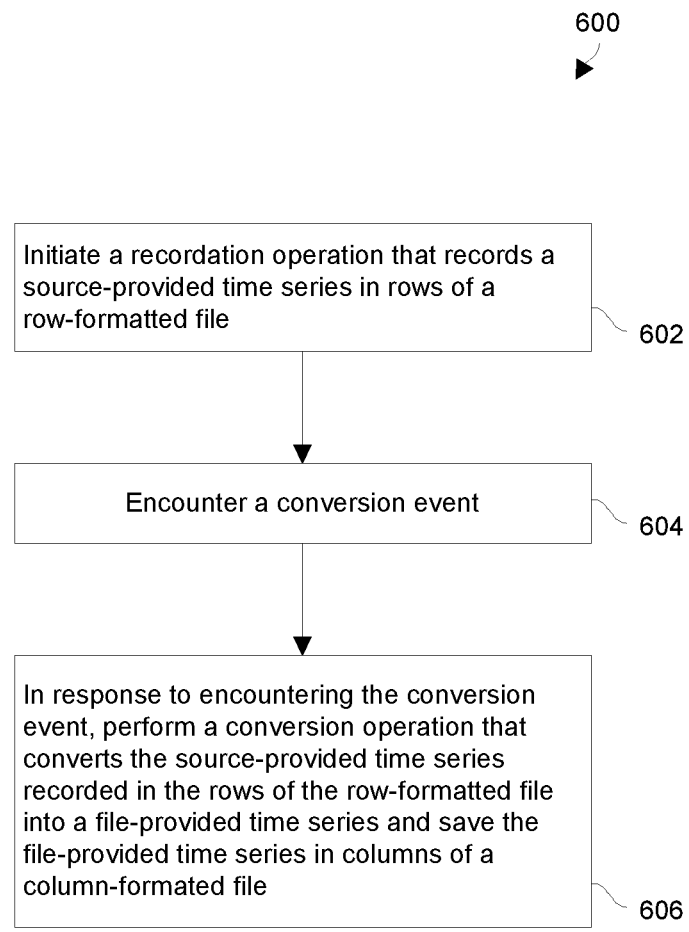
FIG. 7 is a flowchart of a procedure which is performed by specialized circuitry in accordance with certain embodiments.

FIG. 7 is a flowchart of a procedure 600 which is performed by specialized circuitry when performing file-based time series management in accordance with certain embodiments. Such a procedure 600 advantageously provides faster access (e.g., reading and writing) and consumes less storage space than a conventional approach of simply placing data in a database or file.

At 602, the specialized circuitry initiates a recordation operation that records a source-provided time series (also see the raw time series 220 in FIG. 3) in rows of a row-formatted file. For example, the specialized circuitry may periodically receive performance data such as CPU utilization, IOPS information, and/or latency, and so on.

At 604, after the recordation operation is initiated, the specialized circuitry encounters a conversion event. For example, the specialized circuitry may determine that the row-formatted file has recorded a predefined amount of information such as data points covering a period of one hour.

At 606, in response to encountering the conversion event, the specialized circuitry performs a conversion operation that converts the source-provided time series recorded in the rows of the row-formatted file into a file-provided time series (also see the processed time series 240 in FIG. 3) and saves the file-provided time series in columns of a column-formatted file.

As described above, improved techniques are directed to performing file-based time series management using both a row-formatted file 224 and a column-formatted file 244. In particular, a raw time series 220 is recorded in rows 222 of the row-formatted file 224. A conversion operation is then performed that converts the raw time series 220 from the row-formatted file 224 into a processed time series 240 which is saved in columns 242 of the column-formatted file 244. Such use of the row-formatted file 224 enables fast storage of the raw time series 220. Additionally, such use of the column-formatted file 244 enables fast retrieval of the processed time series 240 for display and/or analysis purposes, as well as minimal consumption of storage space. Accordingly, such techniques are particularly well suited for certain applications that record samples of a time series relatively frequently (e.g., every 5 seconds or less) over a relatively long period of time (e.g., over a 48 hour period), and then graphically render the time series such as a performance analysis tool for data storage equipment.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as one or more host computers 22 and/or one or more other devices 28 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that certain above-described techniques were explained in the context of data storage. It should be appreciated that such techniques have applications to other disciplines and/or technologies such as financial applications (e.g., asset price analysis), fluid dynamics (e.g., fluid process management), health systems, and so on, where data is obtained frequently, storage space is limited, rendering is over a relative long period of time, combinations thereof, etc.

Furthermore, it should be understood that conventional metrics collection may use a database or CSV input having just a single timestamp entry. In such conventional approaches, the required data storage footprint is 5 times more than the same data stored in a column-formatted file such as a parquet data file. Unfortunately, even though parquet data file storage has smaller footprint, parquet data files do not satisfy certain requirements such as being well-suited for fast data population.

However, in accordance with certain embodiments, data is initially stored in a row-formatted file but then moved to a column-formatted file (e.g., after amassing data over a long period of time such as an hour in five second intervals). Such conversion from row-formatted file storage to column-formatted file bridges the gap.

As described herein, certain techniques are directed to file-based data collection optimization for time series query systems. Based on certain experimental tests and/or calculations, it was determined that certain data, when held in a database, consumes 8.7 GB. Unfortunately, the same data held in a row-formatted file still consumed a large space such as 4.7 GB. However, the same data in a column-formatted file only consumed 1.6 GB thus providing a significant storage space savings.

In accordance with certain embodiments, certain techniques support a collection frequency of one second. Along these lines, on the same time data producing system, the circuitry creates data for the fast one second collection. The data is a live stream and each point is timestamped data for all acquired objects. As a result, the live stream provides a time-series of the objects.

In accordance with certain embodiments, techniques combine row-based fast data creation with fast column-based time-series objects retrieval:

1. The data producing system appended a comma-separated values (CSV) file by adding a row to an object designated file.
2. There is limited rollup-time before the data in the CSV file is converted to a column-based file (e.g., an ORC file). (Parquet files do not have append possibility, and one second partitions are not practical for a time-series consumption).
3. The optimized rollup time for a 48 hours of collection is one hour.
4. At any given time there will be one CSV file for a current hour of data collection, and 47 column-based files.
5. Hourly roll-ups convert the row-based CSV file to the column-based files. Accordingly, the resulting data requirement is only 1.8 GB for 48 hours of time series data.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of performing file-based time series management, the method comprising:
   initiating a recordation operation that records a source-provided time series in rows of a row-formatted file;
   after the recordation operation is initiated, encountering a conversion event;
   in response to encountering the conversion event, performing a conversion operation that converts the source-provided time series recorded in the rows of the row-formatted file into a file-provided time series and saving the file-provided time series in columns of a column-formatted file; and
   after the file-provided time series is saved in the columns of the column-formatted file, reading the file-provided time series from the columns of the column-formatted file and rendering at least a portion of the file-provided time series on a display to a user;
   wherein the source-provided time series and the file-provided time series contain data storage array performance metrics measured during a time period; and
   wherein rendering includes:
   presenting a graphical user interface (GUI) to the user, the GUI graphically displaying at least some of the data storage array performance metrics measured during the time period to the user.

2. A method as in claim 1 wherein initiating the recordation operation includes:
   periodically recording a new central processing unit (CPU) measurement from a data storage array in a separate row of the row-formatted file, the rows of the row-formatted file being ordered based on time.

3. A method as in claim 1 wherein initiating the recordation operation includes:
   periodically recording a new input/output (I/O) measurement from a data storage array in a separate row of the row-formatted file, the rows of the row-formatted file being ordered based on time.

4. A method as in claim 1 wherein initiating the recordation operation includes:
   periodically recording a new latency measurement from a data storage array in a separate row of the row-formatted file, the rows of the row-formatted file being ordered based on time.

5. A method as in claim 1 wherein initiating the recordation operation further includes:
   prior to recording the source-provided time series in the rows of the row-formatted file, starting a conversion event timer; and
   wherein encountering the conversion event includes:
   detecting, as the conversion event, expiration of the conversion event timer.

6. A method as in claim 1 wherein encountering the conversion event includes:
   detecting, as the conversion event, that a number of rows in the row-formatted file has reached a predefined threshold number.

7. A method as in claim 1 wherein encountering the conversion event includes:
   detecting, as the conversion event, that the source-provided time series covers a predefined amount of time.

8. A method as in claim 1 wherein performing the conversion operation includes:
   reading rows of data storage performance metrics from the row-formatted file and writing the data storage performance metrics in the columns of the column-formatted file.

9. A method as in claim 8 wherein the row-formatted file is a delimiter-separated values file.

10. A method as in claim 9 wherein the column-formatted file is a flat columnar storage format file.

11. A method as in claim 1, further comprising:
    in response to encountering the conversion event, initiating another recordation operation that records another source-provided time series in rows of another row-formatted file.

12. A method as in claim 11 wherein the source-provided time
    series contains data storage array performance metrics measured during a first time period;
    wherein the other source-provided time series contains data storage array performance metrics measured during a second time period after the first time period; and
    wherein the method further comprises:
    rendering at least a portion of the other source-provided time series on the display to the user.

13. A method as in claim 12, further comprising:
    rendering at least a portion of another file-provided time series on the display to the user, the other file-provided time series being rendered from another column-formatted file that saves the other file-provided time series in columns of the other column-formatted file.

14. Data storage equipment, comprising:
    a display;
    memory; and
    control circuitry coupled to the display and the memory, the memory storing instructions which, when carried out by the control circuitry, cause the control circuitry to perform a method of:
    initiating a recordation operation that records a source-provided time series in rows of a row-formatted file,
    after the recordation operation is initiated, encountering a conversion event,
    in response to encountering the conversion event, performing a conversion operation that converts the source-provided time series recorded in the rows of the row-formatted file into a file-provided time series and saving the file-provided time series in columns of a column-formatted file, and
    after the file-provided time series is saved in the columns of the column-formatted file, reading the file-provided time series from the columns of the column-formatted file and rendering at least a portion of the file-provided time series on the display to a user;
    wherein the source-provided time series and the file-provided time series contain data storage array performance metrics measured during a time period; and
    wherein rendering includes:
    presenting a graphical user interface (GUI) to the user, the GUI graphically displaying at least some of the data storage array performance metrics measured during the time period to the user.

15. A computer program product having a non-transitory computer readable medium which stores a set of instructions to perform file-based time series management; the set of instructions, when carried out by computerized circuitry, causing the computerized circuitry to perform a method of:

initiating a recordation operation that records a source-provided time series in rows of a row-formatted file;

after the recordation operation is initiated, encountering a conversion event;

in response to encountering the conversion event, performing a conversion operation that converts the source-provided time series recorded in the rows of the row-formatted file into a file-provided time series and saving the file-provided time series in columns of a column-formatted file; and after the file-provided time series is saved in the columns of the column-formatted file, reading the file-provided time series from the columns of the column-formatted file and rendering at least a portion of the file-provided time series on a display to a user;

wherein the source-provided time series and the file-provided time series contain data storage array performance metrics measured during a time period; and wherein rendering includes:
presenting a graphical user interface (GUI) to the user, the GUI graphically displaying at least some of the data storage array performance metrics measured during the time period to the user.

16. A method as in claim 1, further comprising:
processing input/output (I/O) requests on behalf of a set of host computers while the GUI graphically displays the at least some of the data storage array performance metrics to the user.

17. Data storage equipment as in claim 14 wherein the method further comprises:
processing input/output (I/O) requests on behalf of a set of host computers while the GUI graphically displays the at least some of the data storage array performance metrics to the user.

18. A computer program product as in claim 15 wherein the method further comprises:
processing input/output (I/O) requests on behalf of a set of host computers while the GUI graphically displays the at least some of the data storage array performance metrics to the user.

19. A method of performing file-based time series management, the method comprising:

initiating a recordation operation that records a source-provided time series in rows of a row-formatted file;

after the recordation operation is initiated, encountering a conversion event;

in response to encountering the conversion event, performing a conversion operation that converts the source-provided time series recorded in the rows of the row-formatted file into a file-provided time series and saving the file-provided time series in columns of a column-formatted file;

after the file-provided time series is saved in the columns of the column-formatted file, reading the file-provided time series from the columns of the column-formatted file and rendering at least a portion of the file-provided time series on a display to a user; and in response to encountering the conversion event, initiating another recordation operation that records another source-provided time series in rows of another row-formatted file;

wherein the source-provided time series contains data storage array performance metrics measured during a first time period;

wherein the other source-provided time series contains data storage array performance metrics measured during a second time period after the first time period; and wherein the method further comprises:
rendering at least a portion of the other source-provided time series on the display to the user.

20. A method as in claim 19, further comprising:
processing input/output (I/O) requests on behalf of a set of host computers while the GUI graphically displays the at least some of the data storage array performance metrics to the user.

* * * * *